United States Patent [19]
Wong et al.

[11] Patent Number: 4,896,335
[45] Date of Patent: Jan. 23, 1990

[54] DIGITAL 2B1Q TRANSMITTER WITH HIGH PRECISION AND LINEARITY TIME DOMAIN RESPONSE

[75] Inventors: Hee Wong, San Jose; Jesus A. Guinea, Santa Clara, both of Calif.

[73] Assignee: National Semiconductor Corporation, Santa Clara, Calif.

[21] Appl. No.: 202,125

[22] Filed: Jun. 3, 1988

[51] Int. Cl.$^4$ .......................................... H04L 27/18
[52] U.S. Cl. ...................................... 375/59; 375/23; 332/112
[58] Field of Search ...................... 375/17, 18, 39, 42, 375/59, 23; 332/9 R, 16 R, 22; 370/8; 360/45

[56] References Cited
U.S. PATENT DOCUMENTS

| | | | |
|---|---|---|---|
| 3,649,915 | 3/1972 | Mildonian, Jr. ...................... | 375/17 |
| 3,956,626 | 5/1976 | Ross ................................... | 455/608 |
| 4,087,642 | 5/1978 | Jessop et al. ......................... | 375/17 |
| 4,355,397 | 10/1982 | Stuart ................................... | 375/39 |
| 4,433,310 | 2/1984 | Bic et al. .............................. | 375/42 |

Primary Examiner—Robert L. Griffin
Assistant Examiner—Stephen Chin
Attorney, Agent, or Firm—Limbach, Limbach & Sutton

[57] ABSTRACT

A digital 2B1Q transmitter utilizes a dual modulator to generate a 2B1Q coded output by summing two binary modulated vectors in a 2:1 weighting ratio, allowing one modulating envelope generator to drive the dual modulator. The modulating envelope is coded in a 1-bit pulse density modulation (PDM) format, permitting the use of simple gating functions in performing the modulation function. The rising half of the transmit pulse is stored in the envelope generator, while the trailing half is derived from the rising half using the "$1-x$" function; this allows part of the summing functions to be reduced to OR gates.

5 Claims, 11 Drawing Sheets

DIGITAL TO ANALOG CONVERTER

DIGITAL 2B1Q TRANSMITTER WITH HIGH PRECISION AND LINEARITY TIME DOMAIN RESPONSE

MICROFICHE APPENDIX

The disclosure of this patent document includes a microfiche appendix consisting of a single sheet that includes fourteen (14) frames.

COPYRIGHT NOTICE

Portions of the disclosure of this patent document, in particular microfiche Appendices A-C, contain unpublished material which is subject to copyright protection. The copyright owner, National Semiconductor Corporation, has no objection to the facsimile reproduction by anyone of the patent document or the patent disclosure, as it appears in the U.S. Patent and Trademark Office patent files or records, but otherwise reserves all rights whatsoever.

BACKGROUND OF THE INVENTION

1. Field of the Invention

The present invention relates to telecommunications devices and, in particular, to a digital 2B1Q transmitter circuit which meets the high precision and linearity time domain response requirements of the U-interface ISDN standard.

2. Discussion of the Prior Art

Communication over a digital subscriber line (DSL) in the evolving Integrated Services Digital Network (ISDN) requires error-free transmission of binary data with the alphabet B=(0, 1) at a bit rate of 160 kg/sec. Line impairments, such as attenuation/dispersion and cross-talk noise, corrupt the received signal at the receive end of the DSL and introduce error.

To counter these impairments and to remove error, different modulation techniques can be employed that result in bandwidth reduction of the transmitted signal. The modulation technique adopted by American National Standards Institute (ANSI) for use over the DSL is called 2B1Q line coding. According to this coding technique, successive pairs of binary data B are one-to-one mapped onto successive units of quaternary symbols with alphabet Q=(−3, −1, +1, +3) and transmitted as a corresponding voltage level at half the rate of the binary sequence. Therefore, an incoming binary stream B with bit rate of 160 kbit/sec. is converted into a quaternary stream Q with symbol rate of 80 kbit/sec. and then transmitted over the DSL.

There are two basic approaches to the design of transmitter circuits, recursive and non-recursive.

A typical example of the recursive approach is to feed square wave pulses, amplitude modulated according to 2B1Q levels, through a linear low-pass filter.

The recursive approach is not generally utilized for echo canceller applications for the following reasons. First, if a continuous filter approach is utilized, it is difficult to control the pulse envelope because of roll-off frequency variations. If the frequency controlling elements, such as resistors and capacitors, are locked to an on-chip reference, linearity can be a problem. Furthermore, cost and yield are also known factors. If a switched-capacitor approach is utilized, then two filters are required, one to provide the basic pulse shaping and the other for anti-alias filtering.

In general, in recursive filters, the trailing portion of the pulse after filtering extends too many baud periods due to the recursive nature of the filters. This increases the number of taps in the echo canceller circuit. In addition, the summation of pulse tails demands an extended dynamic range for the transmitter driver to handle the voltage swings. This stresses the linearity/cost/power design requirements of the driver circuit.

Furthermore, the amount of pulse undershoot after filtering normally is significant compared to the pulse template. Undershoot as high as 5% to 8% of the main pulse amplitude has been observed. Since 12% is the limit for the undershoot template, there is little margin left for the design of the line transformer.

Additionally, the slope (dV/dt) of the filtered transmitter pulse normally is steeper than the pulse slope generated from a non-recursive circuit. A high order, low-Q filter is the only solution if cost is not a major concern (pre-processing in the drive signal is also a solution, but falls into the non-recursive category). The high dV/dt signal leaves less jitter margin for the timing circuit that drives the transmitter/filter circuits. In some cases, a "differential canceller" is required to handle this type of impairment.

The non-recursive approach also suffers from some disadvantages. First, silicon area for integrating a transversal filter is usually high compared to other approaches. Pre-processing the drive signal using a current-slewing method has a wide performance distribution due to process variation; usually, this is not a practical solution for silicon implementation. A ROM look-up method always requires a high resolution digital-to-analog converter (DAC) because of the required summation of vectors in the modulation process. It is costly to build a high resolution DAC with high degree of linearity. For example, for eight bits or more, a 3-bit DAC is the theoretical minimum for any approach including filtering methods, the combination yielding five levels: (+3, +1, 0, −1, −3).

SUMMARY OF THE INVENTION

The present invention provides a digital 2B1Q transmitter circuit having U-interface applications. The circuit meets the U-interface ISDN standard specification demands for a high precision and linearity time domain response.

The digital 2B1Q transmitter circuit of the present invention includes a novel, all-digital pulse density modulator (PDM), which reaches the U-interface precision requirement with a simplicity that rivals standard filter approaches. The selective control of the shape and persistance tail maps into well-behaved spectral properties. The binary PDM modulation intrinsically results in high linearity and is unmatched by conventional techniques. To meet the demand for integratability and low cost, the transmitter circuit of the present invention allows low resolution digital to analog conversion and the number of computations has been reduced to a minimum. The design is insensitive to jitter affects and to process variations in the analog post filter and line interface circuits.

A digital 2B1Q transmitter circuit in accordance with the present invention utilizes a dual modulator to generate a 2B1Q signal by summing two binary modulated vectors in a 2:1 weighting ratio. This allows a single modulating envelope generator to drive the dual modulator. The modulating envelope is coded in a 1 bit pulse density modulation (PDM) format. This permits the use of AND gates (or equivalent, such as PLAs) in performing the multiplying (modulation) function. The rising half of the transmit pulse is stored in the envelope generator, while the trailing half is derived from the rising half using the "1-X" function. This allows part of the summing functions to be reduced to OR gates or equivalent.

All of the modulation and summation processes are embodied in a small PLA circuit. This PLA also includes the 2B1Q code conversion and DAC bit-encoding functions. The circuit permits the use of a low-resolution 3-bit DAC to generate the 2B1Q signal with a high degree of linearity.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

The present invention provides a digital transmitter circuit for U-interface Integrated Services Digital Network (ISDN) applications.

The line code of the transmitter embodiment described below is 2B1Q (2 binary, 1 quaternary), a four-level pulse amplitude modulation (PAM) code without redundancy. The nominal baud rate is 80 Kbaud. The transmission system uses an echo canceller with hybrid principle to provide full duplex operation over a two wire subscriber loop.

The "2-wire echo canceller" system imposes a stringent performance requirement on the design of the transmitter circuit. The primary performance criteria is to reduce the transmit (Tx) residue to a minimum (typically below −70 dB) at the receive (Rx) input.

The transmitter circuit described below belongs to the non-recursive class. Several techniques are employed within the circuit to reduce the resolution requirement of its digital-to analog converter (DAC) and the amount of computation required in the modulation process. The pulse envelope is a modified cosine wave which eliminates undershoot and "tailing" problems. The dV/dt slope is a minimum and is determined by the U-interface power level specification.

Figure 1:
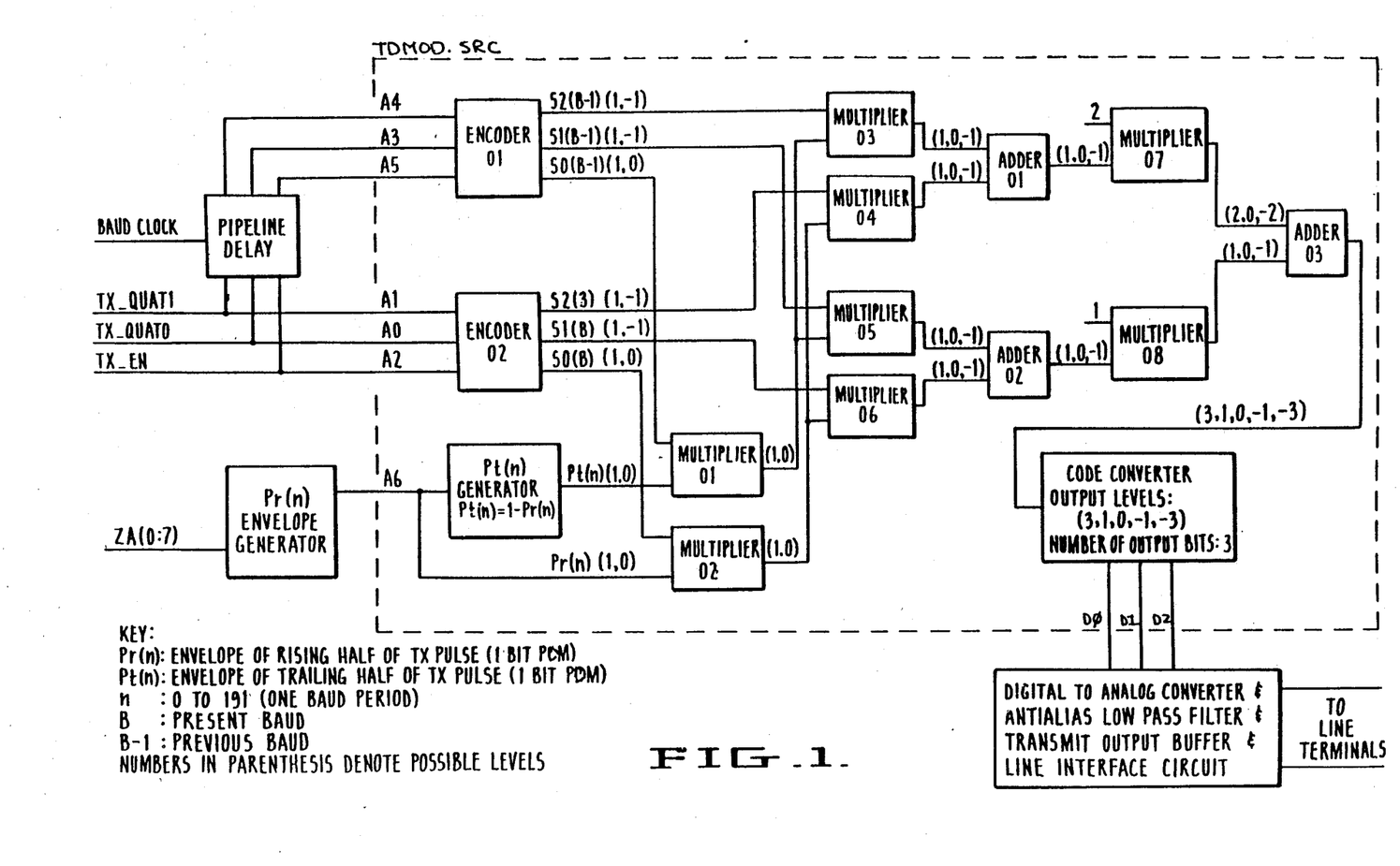
FIG. 1 is a block diagram illustrating a digital 2B1Q transmitter in accordance with the present invention.

The design of the transmitter circuit of the present invention can be viewed generally with reference to FIG. 1. The 2B1Q receive signal can be viewed as the summation of two binary modulated vectors V1 and V2. These two vectors are generated from two identical binary modulators M1 and M2. The transmitter output y(n) is obtained by summing two parts of the V2 vector and 1 part of the V1 vector, resulting in a 4-level 2B1Q signal (+3, +1, −1, −3), that is, $$y(n) = V2*2 + V1 \tag{1}$$

To meet the U-interface requirements, this output signal y(n) must comply with a T1D1 pulse template and spectral requirements. Therefore, an envelope generator is required for the vector modulating signal (since the two modulators are identical, only one envelope is required).

A modified raised-cosine pulse is selected for the basic envelope; its duration occupies less than 2 baud periods. A source listing of the program "PULSE.SRC" utilized to generate the pulse envelope waveform is provided as Appendix A at the end of this specification.

The pulse envelope equation consists of two parts:

$$Prt(n) = Pr(n) + Pt(n+192) \tag{2}$$

where   Prt(n)    the modulating pulse envelope
        Pr(n)     the rising half of the pulse
                  envelope
        Pt(n + 192)  the trailing half of the pulse
                  envelope, "n + 192" depicts this
                  half lies in the next baud
                  period.
        n =       0 to 191 (envelope timing
                  registration counts, there are
                  192 counts in 1 baud period).

Therefore, the modulation equations can be written as $$Vx = Vrx + Vtx \tag{3}$$

$$Vrx = Sx(B)*Pr(n) \tag{4}$$

$$Vtx = Sx(B-1)*Pt(n) \tag{5}$$

where Vx is the general case of V1 and V2, the modulated vectors, and
  Vrx is the rising half of Vx,
  Vtx is the trailing half of Vx,
  Sx is the general case of S1 and S2, data inputs feeding the dual modulator,
  B is the present baud,
  B−1 is the previous baud.

For pulse mask testing and transmit soft muting purposes, a 5 level (+3, +1, 0, −1, −3) 2B1Q signal is required. Therefore, Equations 4 and 5 above are modified as follows:

$$V_{rx} = S_x(B) * S_0(B) * P_r(n) \qquad (6)$$

$$V_{tx} = S_x(B-1) * S_0(B-1) * P_t(n) \qquad (7)$$

where S0 is the third input (the first two inputs are S1 and S2) for describing the type of transmit symbol. If S0(B)=0, then the symbol during B is a "Null" symbol.

Summing Equations 1 through 7 above results in $$y(n) = [S2(B)*S0(B)*Pr(n) + S2(B-1)*S0(B-1)*Pt(-n)]*2 + [S1(B)*S0(B)*Pr(n) + S1(B-1)*S0(B-1)*Pt(n)] \qquad (8)$$

Equation 8 clearly shows that the system yields maximum linearity (the amplitude or power ratio of $+-3$ symbols to $+-1$ symbols) if there is no truncation error during the computational process. This is due to the fact that all symbol generation is based on one envelope vector, Prt(n). Equation 8 also implies that the output dynamic range is 6 times larger than m, the number of quantization levels of Pr(n) and Pt(n). This explains why the conventional ROM approach requires a high resolution DAC for the output circuit; that is, if the envelope is implemented with 128 levels (m=128, 7 bits), then the DAC requirement is 10 bits (6*128=768 levels).

The transmitter design approach described below follows Equation 8 to generate the 2B1Q signal. The following techniques are implemented to reduce the size of the DAC as well as the arithmetic unit:

a. Pr(n) and Pt(n) are coded in a 1-bit Pulse Density Modulation (PDM) format. Possible values are 1 and 0. Since the data inputs are in binary format, the modulator becomes two AND gates.

b. Making Pt(n)=1−Pr(n) so that Equation 3 is simply an OR function and the output dynamic range is reduced by one half.

FIGS. 2A-2D combine to provide a schematic diagram of a digital 2B1Q transmitter circuit in accordance with the present invention.

The embodiment of the transmitter circuit shown therein includes an input pipeline delay consisting of flip-flops 12 and 14. The basic inputs to the pipeline delay are TX_EN, TXQUAT1 and TX_QUAT0. TX_QUAT1 and TX_QUAT0 are dibit inputs for specifying the type of output signal according to the following mapping:

| TX_QUAT1 | TX_QUAT0 | SYMBOL |
|---|---|---|
| 1 | 1 | +1 |
| 1 | 0 | +3 |
| 0 | 1 | −1 |
| 0 | 0 | −3 |

Figure 2A:
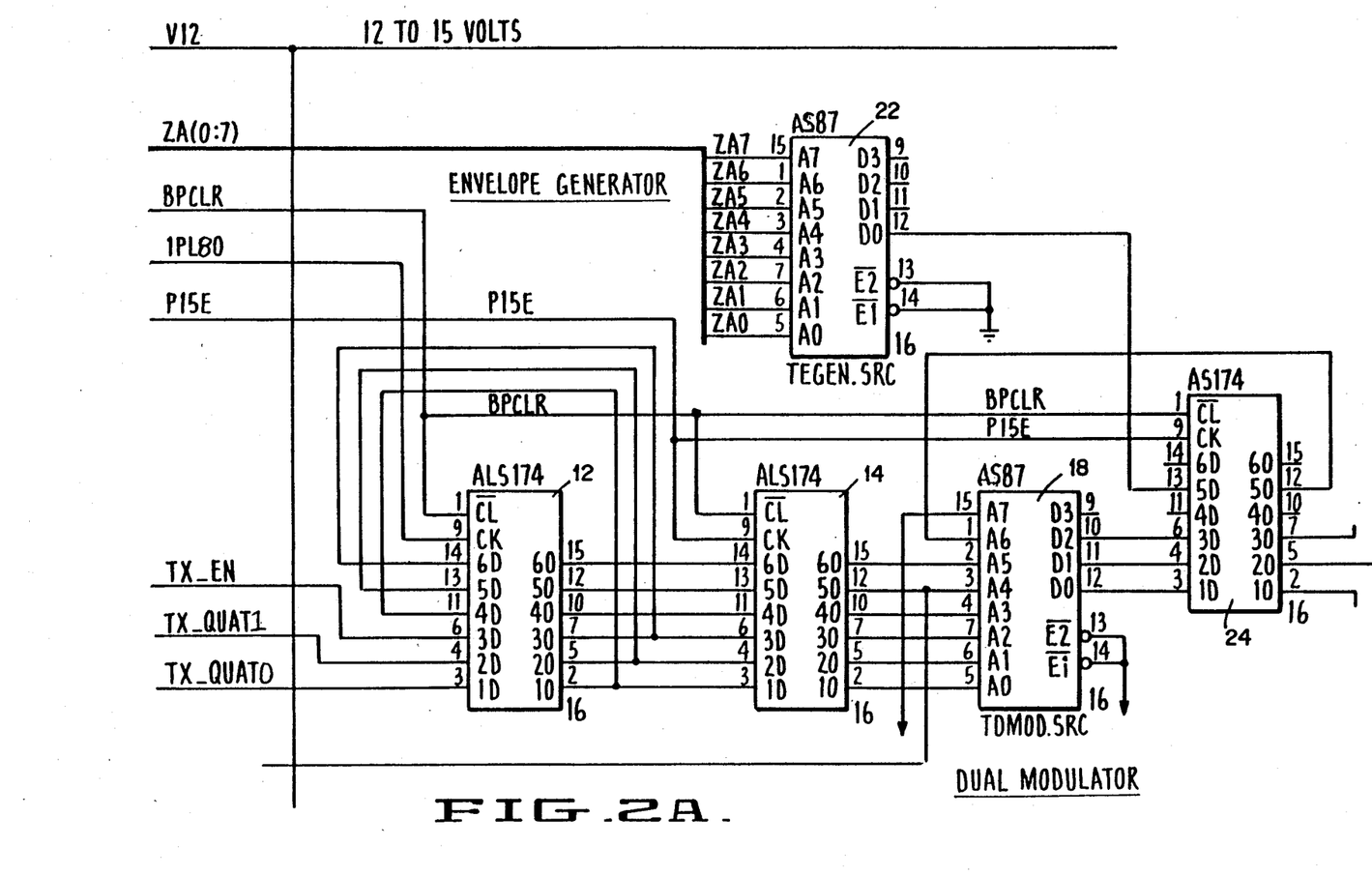
FIGS. 2A-2D combine to provide a schematic diagram illustrating a digital 2B1Q transmitter circuit in accordance with the present invention.

These inputs are clocked into the transmitter registers at the positive edges of baud clock, identified as IPL80 in FIG. 2A, which is an inverted phase locked 80K clock. The symbol types are classified at TX_OUT.

The TX_EN input has the same timing as inputs TX_QUAT1 and TX_QUAT0. If TX_EN=0 during baud (x), then a null symbol is transmitted during this baud period; the transmitter output during this period contains the trailing/rising halves of the previous/future symbols, respectively. If one of these symbols is not a null symbol, that is, it is $+/-3$ or $+/-1$, then the transmitter output is non-zero. If TX_EN=1, then the transmitted symbol is determined by the TX_QUAT1 and TX_QUAT0 inputs.

Thus, the control input TX_EN may be used, for example, for soft muting during handshaking and for pulse mask testing.

These three inputs are read into device 12 at positive edges of the baud clock.

Three three output pins 7, 5 and 2 of flip-flop 12 are fed back to its input pins 11, 13 and 14 for generation of the B−1 previous baud signals. At this stage, there are 6 output signals from device 12. These 6 signals are then pipelined through flip-flop 14 for driving a dual modulator, PLA 18 in FIG. 2. Note that these signals represent the Sx(B−1) and Sx(B) vector signals after coding by encoders 01 and 02, respectively, as shown in the FIG. 1 block diagram.

An envelope generator, shown in FIG. 2 as PLA 22 (8 address lines, 1 data line and 23 product terms), provides the modulation envelope in a 1-bit pulse density modulation (PDM) format. The 8 address lines A0-A7 of PLA 22 are connected to receive the outputs ZA(0:7) of a digital phase locked loop (not shown) which counts from 0 to 191 in one baud period. The timing is synchronized to either the frame sync in the LT mode or to the receive signal in the NT mode.

In the LT mode, the transmitter timing is phase locked to the network clock (i.e. 8 KHz frame syncs).

In the NT mode, the transmitter timing is phase locked to the receiver signal).

The source listing for the code algorithm (TEGEN.SRC) of envelope generator PLA 22 is provided as Appendix B at the end of this specification. Note that only Pr(n) is stored in PLA 22, while Pt(n) is generated in the dual modulator, which is described in detail below.

Figure 2B:
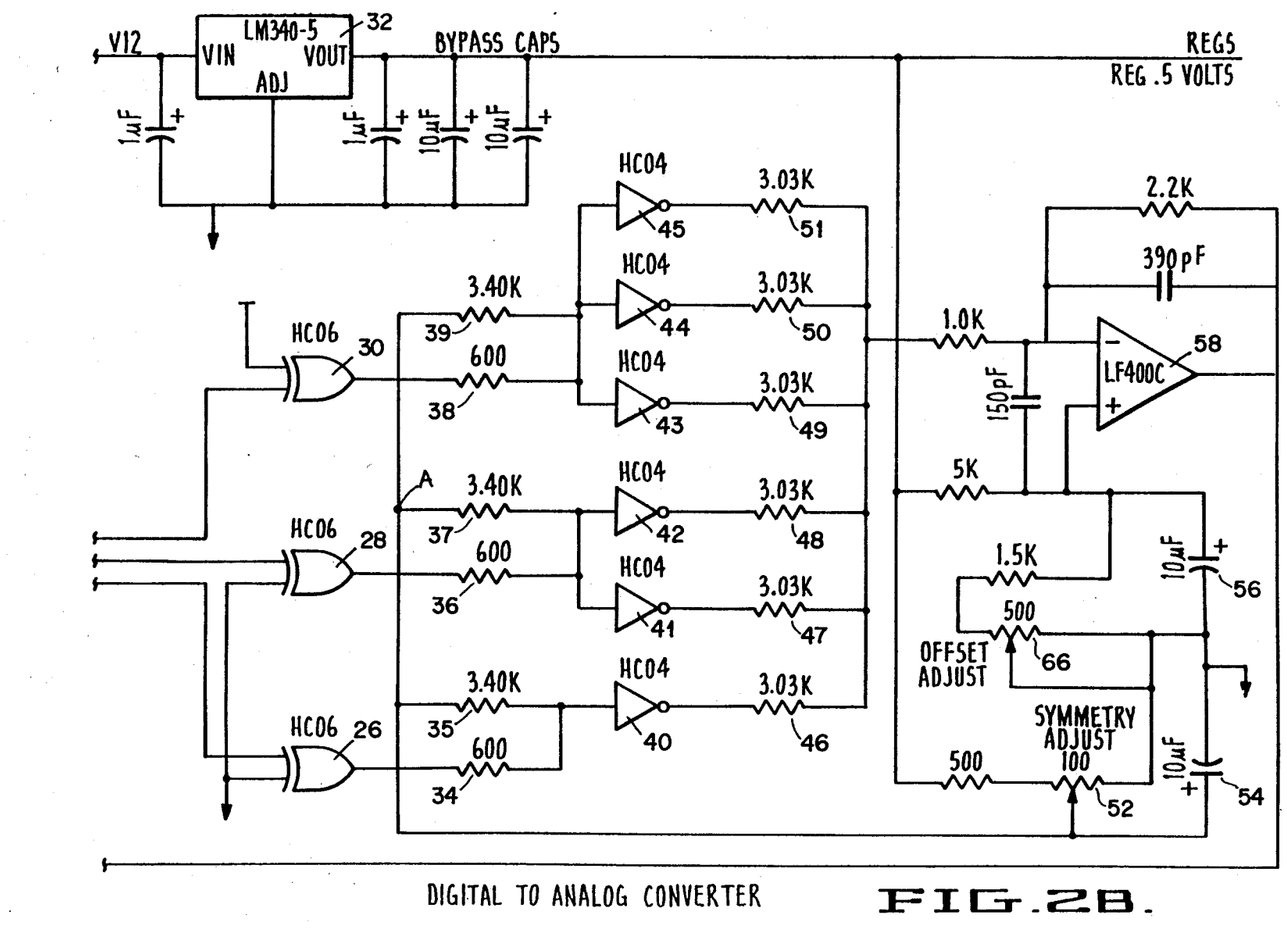
Figure 2C:
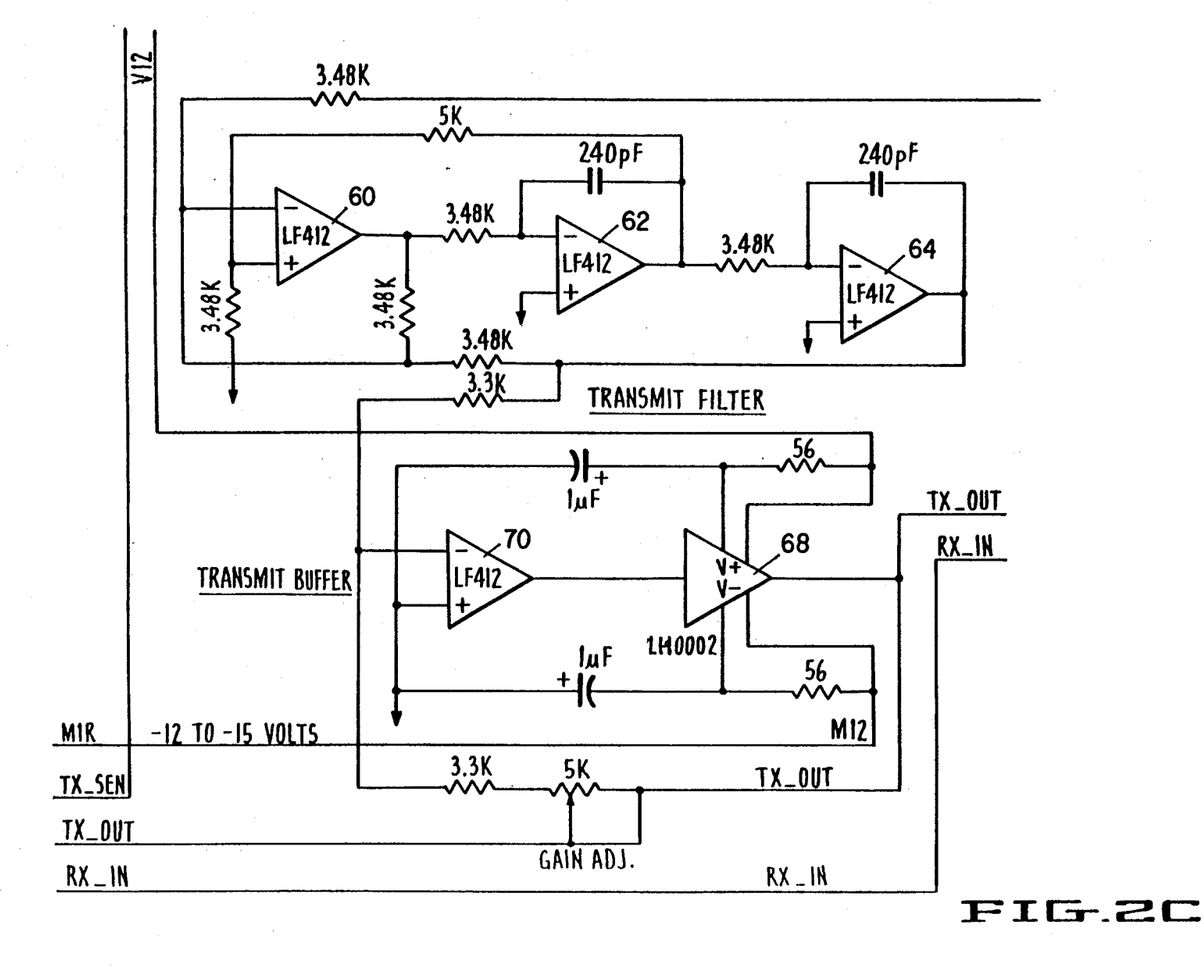
Figure 2D:
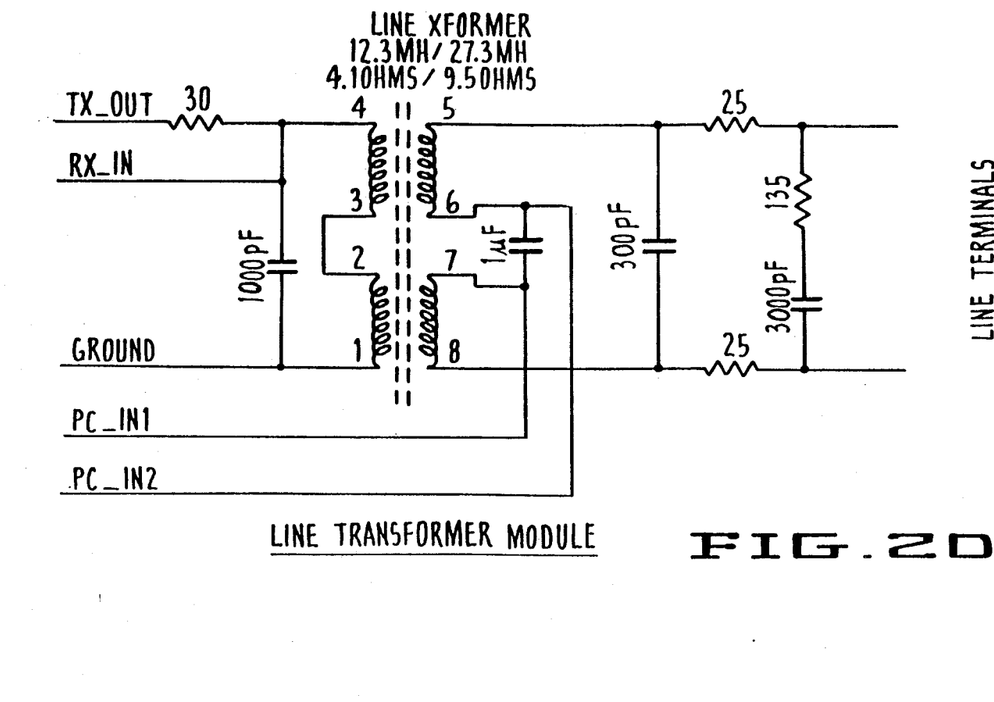
Figure 3:
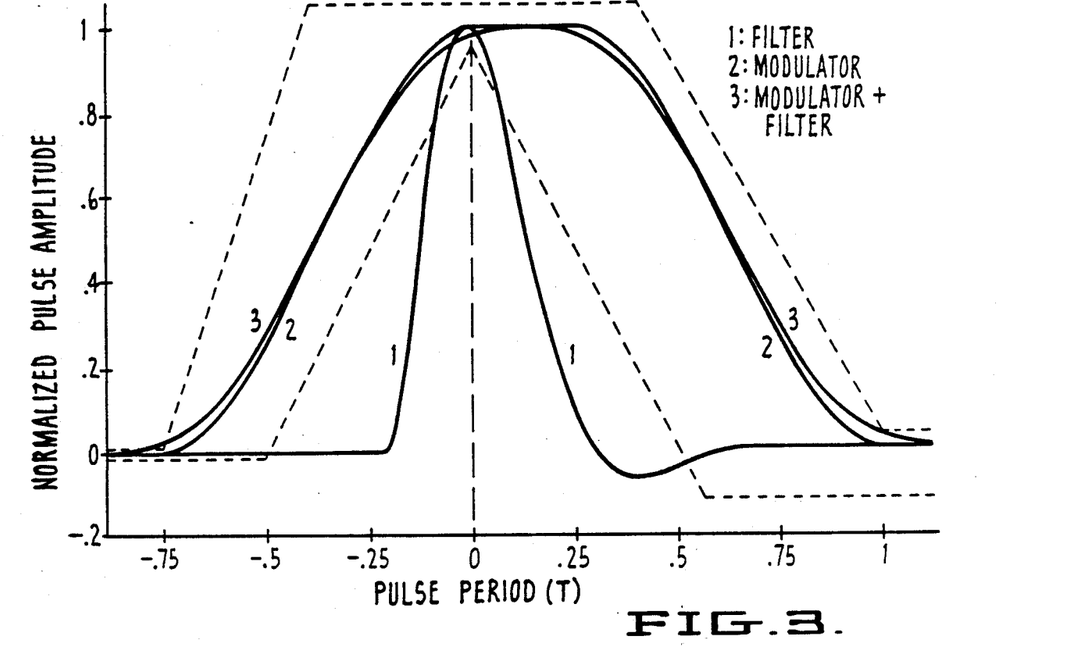
FIG. 3 is a graph illustrating the pulse response of the transmitter circuit shown in FIGS. 2A-2D at a 120 KHz anti-alias cut-off filter frequency.
Figure 4:
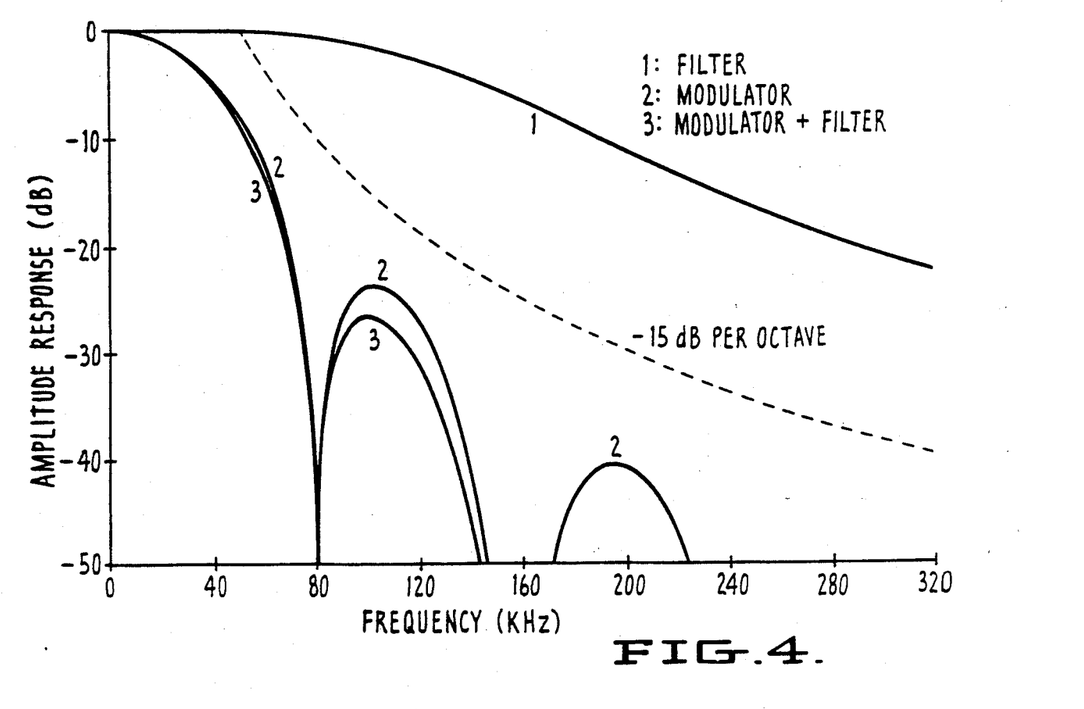
FIG. 4 is a graph illustrating the output spectrum of the transmitter circuit shown in FIGS. 2A-2D at a 120 KHz anti-alias cut-off filter frequency.
Figure 5:
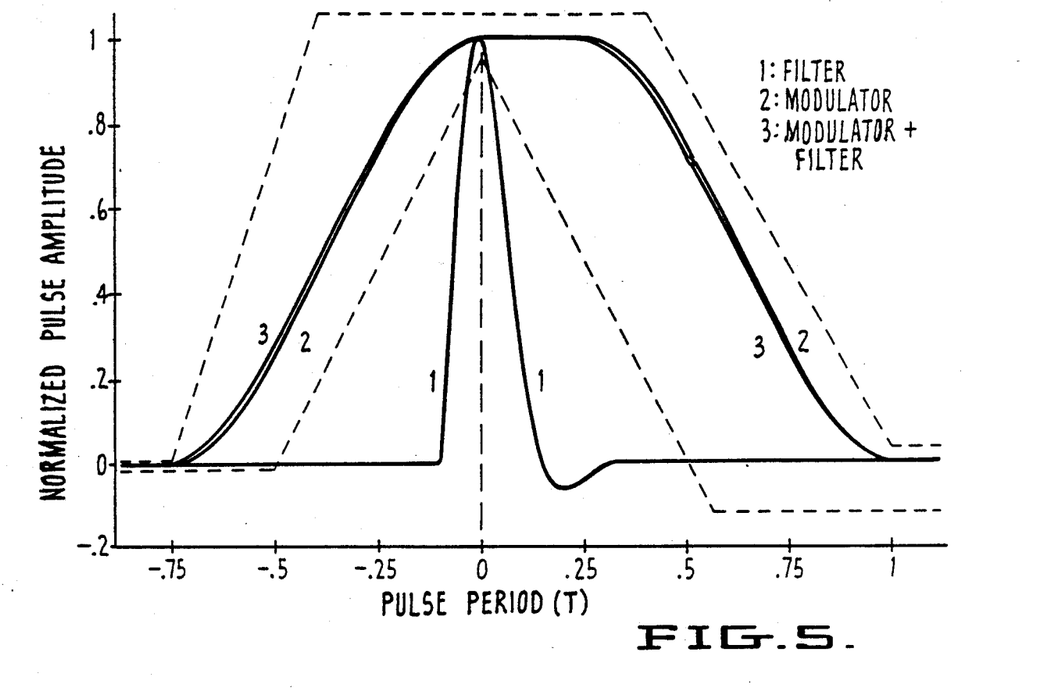
FIG. 5 is a graph illustrating the pulse response of the transmitter circuit shown in FIGS. 2A-2D at a 240 KHz anti-alias cut-off filter frequency.
Figure 6:
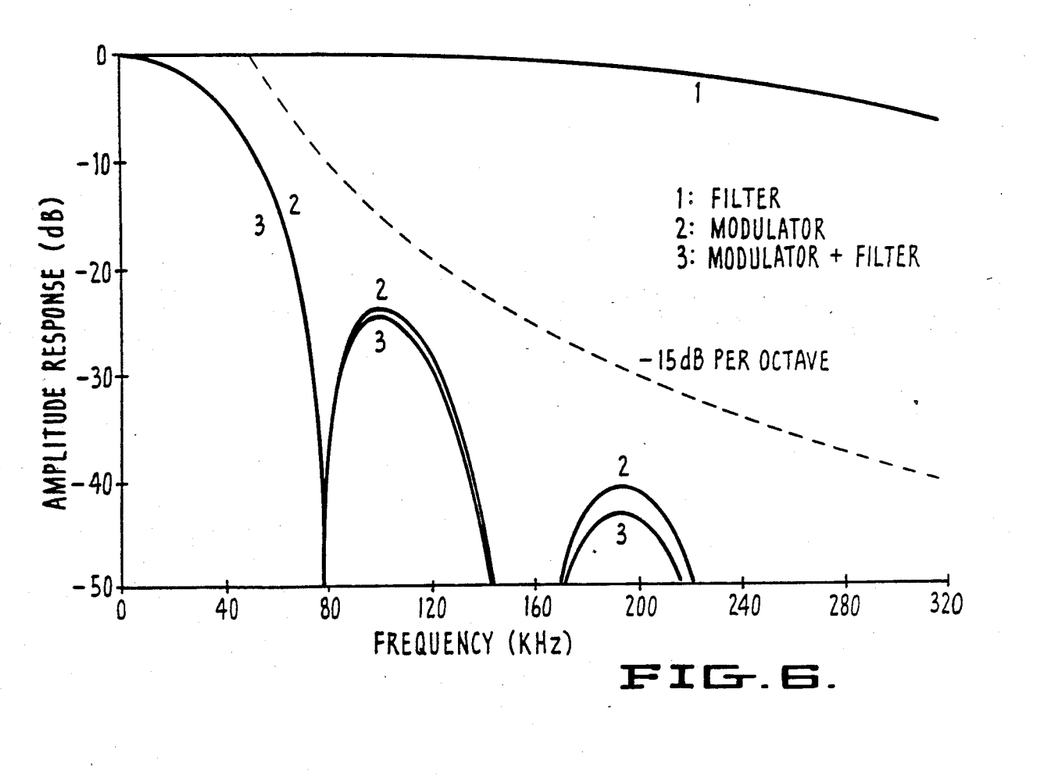
FIG. 6 is a graph illustrating the output spectrum of the transmitter circuit shown in FIGS. 2A-2D at a 240 KHz anti-alias cut-off filter frequency.

Referring to FIGS. 2A and 2B, PLA 18 combines with flip-flop 24 and XOR gates 26, 28 and 30 to form a 2B1Q modulator. The modulator functions are embedded in a 7×3×8 (address×data×product terms) PLA 18. A source listing of the coding algorithm (TDMOD.SRC) of PLA 18 is provided as Appendix C at the end of this specification. The three output pins of the 2B1Q modulator, i.e. pins 7(msb), 5 and 2(1sb) of flip-flop 24, are coded for driving a 3-bit DAC with weighting 3, 2 and 1. The msb (pin 7 of flip-flop 24) is intentionally inverted for power up centering (transmitting null symbols). The inversion is eliminated after the three XOR gates 26, 28, 30. Details are provided in Table 1 below.

TABLE 1

| PLA pin # | | | XOR pin # | | | DAC output | | | |
|---|---|---|---|---|---|---|---|---|---|
| 7 | 5 | 2 | 6 | 11 | 3 | 3 | 2 | 1 | symbol |
| 0 | 1 | 1 | 1 | 1 | 1 | 3 | +2 | +1 | = 6 +3 |
| 0 | 0 | 1 | 1 | 0 | 1 | 3 | | +1 | = 4 +1 |
| 0 | 0 | 0 | 1 | 0 | 0 | 3 | | | = 3 0 (power up) |
| 1 | 1 | 1 | 0 | 1 | 1 | | 2 | +1 | = 3 0 |
| 1 | 1 | 0 | 0 | 1 | 0 | | 2 | | = 2 −1 |
| 1 | 0 | 0 | 0 | 0 | 0 | | | | = 0 −3 |

The 3-bit digital-to-analog converter (DAC), as shown in FIG. 2B, includes an adjustable output regulator 32, six resistors 34-39, six inverters 40-45, and six resistors 46-51. Resistors 46-51 are connected as a 3-bit DAC with weightings 3, 2 and 1. The driving sources are taken from the six inverters 40-45. The inputs to inverters 40-45 have been fed through resistor network 34-39. The common threshold control point, node A, is connected to a symmetry control potentiometer 52. The purpose of this circuit arrangement is to balance the positive and the negative pulse areas such that the even harmonic distortion is kept to a minimum. For silicon implementation, this balancing is not required, since a capacitor stack can be utilized.

The potentiometer 52 is set as follows. First, a code sequence is applied to the TX_QUAT1/0 inputs such that the transmitter is sending a 40 KHz tone (+3, −3, +3, ...). Then potentiometer 52 is adjusted until the even harmonics are < = −65 dB below the main peak (40 KHz).

Operational amplifiers 58, 60, 62 and 64 constitute a 3rd order anti-alias filter. The purpose of this filter is to reject high frequency components generated from the modulator. The design of the pulse envelope, as generated by the PULSE.SRC program provided in Appendix A, reserves a tolerance of 2× for the −3 dB roll-off frequency distribution exhibited in this filter block (i.e., 120 KHz to 240 KHz), so the general pulse envelope should not be affected much by this filter. This is illustrated in the plots provided in FIGS. 3–6.

Figure 7:
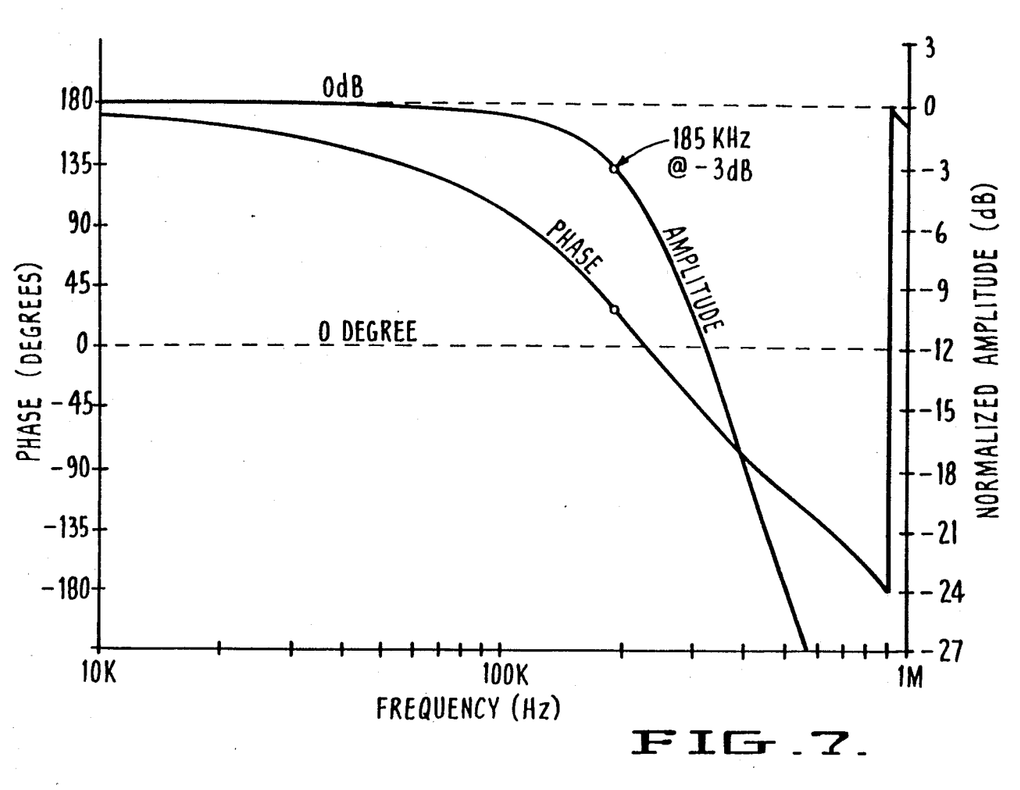
FIG. 7 is a graph illustrating the frequency/phase response of the anti-alias filter of the transmitter circuit shown in FIGS. 2B-2C.
Figure 8:
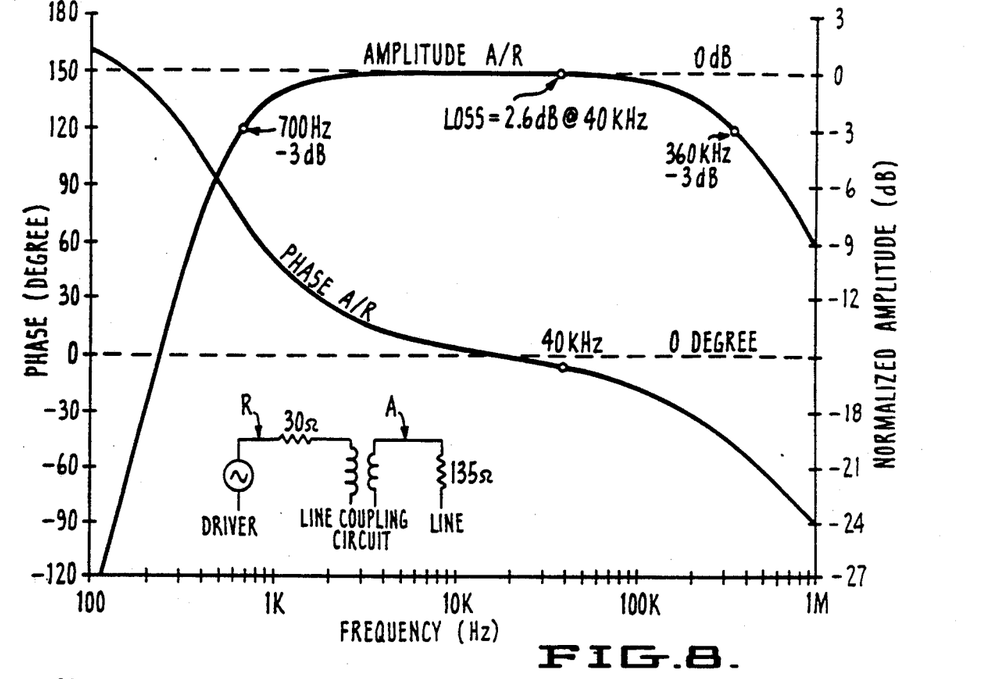
FIG. 8 is a graph illustrating the response of the line coupling circuit of the transmitter shown in FIG. 2D.
Figure 9:
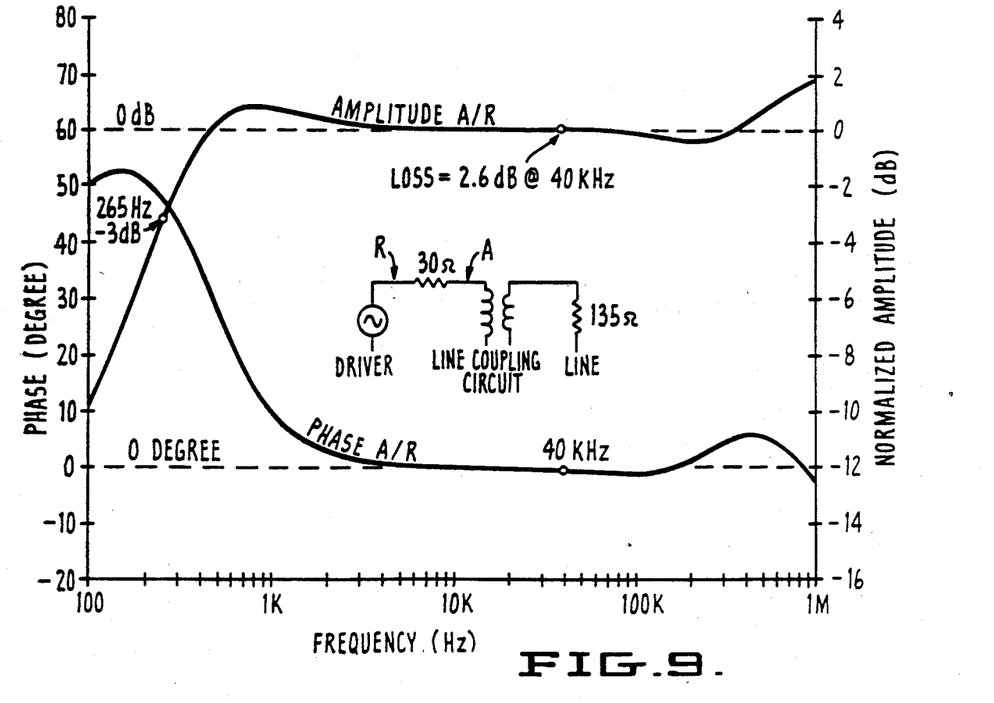
FIG. 9 is a graph illustrating the loading of the line coupling circuit of the transmitter shown in FIG. 2D.
Figure 10:
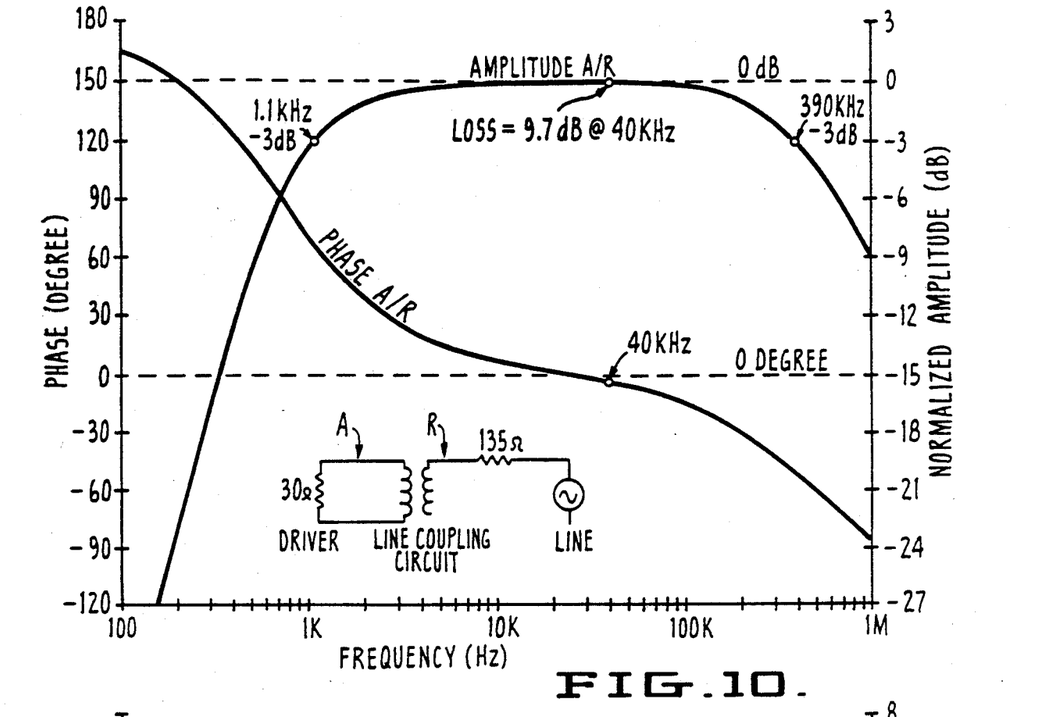
FIG. 10 is a graph illustrating the receiver response of the line coupling circuit shown in FIG. 2D.
Figure 11:
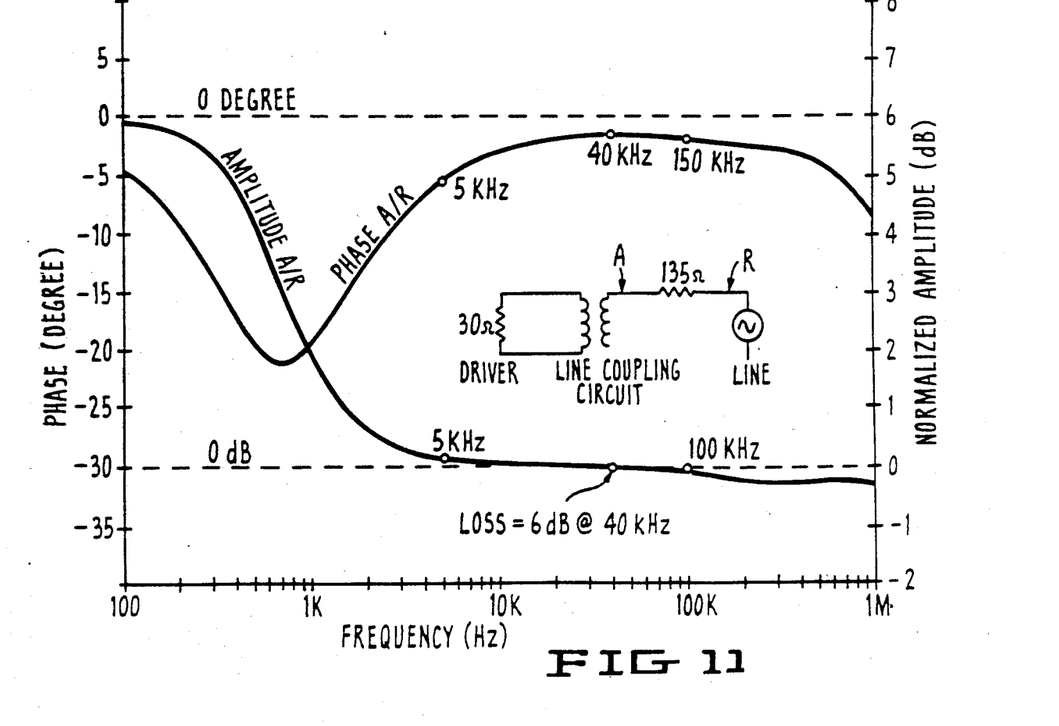
FIG. 11 is a graph illustrating the receiver loading of the coupling circuit shown in FIG. 2D.
Figure 12:
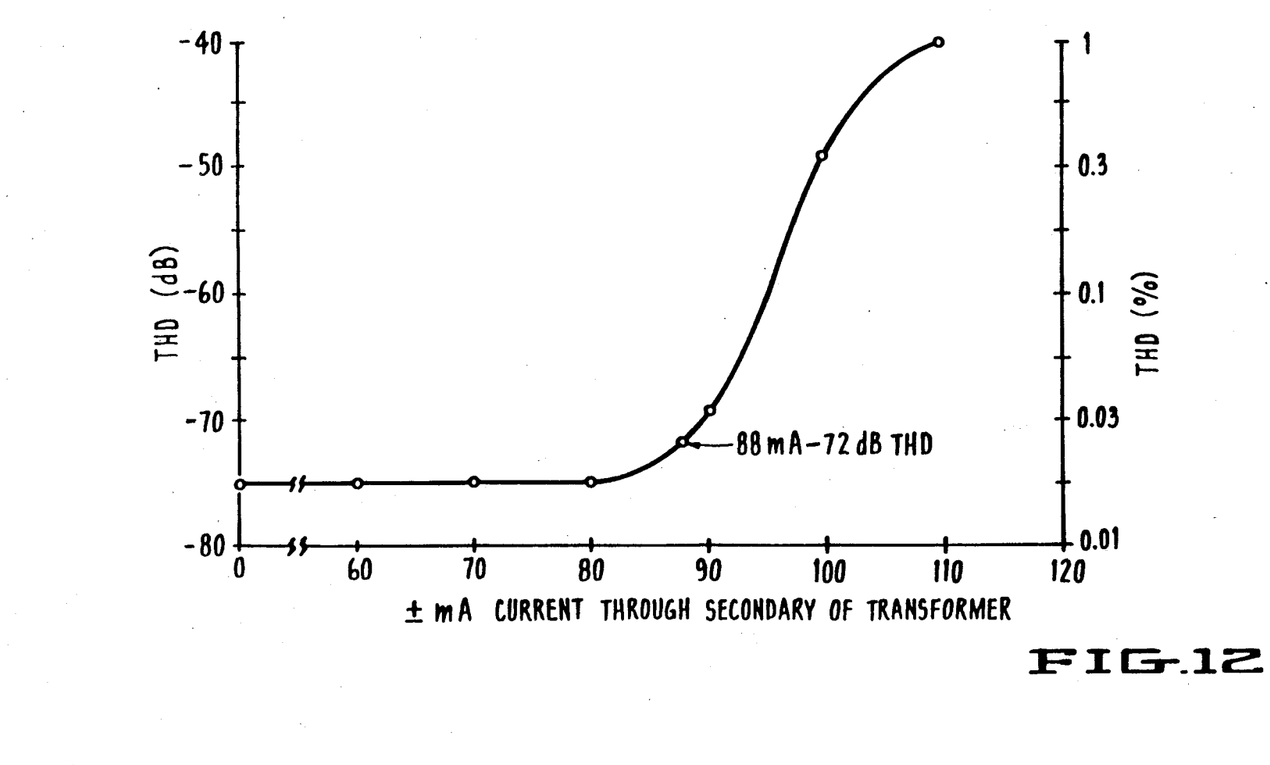
FIG. 12 is a graph illustrating the line transformer THD v DC saturation.

The filter −3 dB roll-off frequency implemented in the breadboard is at 185 KHz. Amplitude/phase plots are provided in FIG. 7.

An offset adjustment potentiometer 66 has been provided for trimming the output offset of driver 68 to zero when sending null symbols. This allowed for accurate pulse envelope measurement during circuit development. For silicon implementation, the trimming is not necessary as long as the offset voltage at the driver output is below 30 mVolt. This equates to 1 mA maximum offset current flowing through the line transformer.

A transmit driver, consisting of op amp 70 and current amplifier 68, buffers the anti-alias filter output to the line transformer.

Transmit attenuation is measured from the output of the transmit driver to the line terminals. The driver output is a constant voltage source which delivers 6.8 V peak to peak (nominal) into the lead. This equates to 2.6 dB loss in the line interface circuit. The driver output level is programmable to cover a range of +/−10% in 16 steps (1.25% per step) with an accuracy of +/−1%. The level adjustment is to compensate different line interface designs and allowance for component tolerances to meet the 5 V +/−5% output required.

The gain adjustment potentiometer should be set as follows. For transmitter outputting, the steps are as follows:

| (1) | 1 × | +3 symbol, | |
| (2) | 119 × | null symbols, | then |
| (3) | 1 × | −3 symbol, | then |
| (4) | 119 × | null symbols, | then repeating the sequence. |

Line terminals are loaded with a 135 Ohms resistor. The potentiometer 66 is then adjusted until the +3 symbol peak is 2.5 volts across the line terminals.

For silicon implementation, the gain trimming is desirable to meet the +−5% specification. The roll-off frequency of the anti-alias filter also contributes to the distribution: values from +1% to −1% are expected.

Performance plots are provided in FIGS. 8–12. The capacitors (1000 pF and 300 pF) placed across the primary and the secondary windings simulate the capacitance of the protection devices used in the IC implementation of the circuit. The return loss compensation RC network (135 Ohms and 3000 pF) is optional if the transformer is able to provide adequate return loss margin at 200 KHz. Eliminating the RC does not affect the pulse envelope.

It should be understood that the invention is not intended to be limited by the specifics of the above-described embodiment, but rather is defined by the accompanying claims.

What is claimed is:

1. A digital transmitter that receives a dibit input and generates a 2B1Q coded output signal which is in compliance with predefined characteristics, the digital transmitter comprising:
    (a) dual modulator means including first and second modulator means responsive to the dibit input for generating first and second binary modulated vectors, respectively;
    (b) means for summing the first and second binary modulated vectors according to a weighting ratio to provide a 2B1Q coded output signal; and
    (c) envelope generator means for providing a modulation envelope for the 2B1Q coded output signal in a pulse density modulation format such that the 2B1Q coded input signal is in compliance with the predefined characteristics.

2. A digital transmitter as in claim 1 and further comprising a code converter for converting the 2B1Q coded output signal to a 3-bit output signal.

3. A digital transmitter as in claim 1 wherein the dual modulator means and the envelope generator means are cooperatively connected such that the envelope generator means generates the rising half of the modulating envelope and the dual modulator generates the trailing half of the modulating envelope.

4. A digital transmitter as in claim 1 and further comprising soft muting means for providing gradual cut-off.

5. A digital transmitter that receives a dibit input and generates a 2B1Q coded output signal which is in compliance with predefined pulse template and spectral characteristics, the digital transmitter comprising:
    (a) a dual modulator comprising first and second modulators responsive to the dibit input for generating first and second binary modulated vectors, respectively;
    (b) means for summing the first and second binary modulated vectors according to a 2:1 weighting ratio to provide a 2B1Q signal;
    (c) an envelope generator for providing a modulation envelope for the 2B1Q signal in a pulse density modulation format such that the 2B1Q signal is in compliance with the predefined pulse template and spectral characteristics;
    (d) a code converter for converting the 2B1Q signal to a 3-bit signal;
    (e) a digital-to-analog converter for converting the 3-bit signal to a corresponding analog signal;
    (f) an anti-alias filter for removing high frequency components from the analog signal to provide a filtered analog signal;
    (g) a transmit output buffer responsive to the filtered analog signal for providing the 2B1Q coded output signal.

* * * * *

UNITED STATES PATENT AND TRADEMARK OFFICE
CERTIFICATE OF CORRECTION

PATENT NO. : 4,896,335

DATED : 1/23/90

INVENTOR(S) : Hee Wong et al.

It is certified that error appears in the above - identified patent and that said Letters Patent is hereby corrected as shown below:

Col. 1, line 33, "kg/sec." should be --kb/sec.--.

Col. 1, line 63, "known" should be --unknown--.

Col. 5, line 62, delete the subscripting.

Col. 6, line 30, "code" should be --coding--.

Col. 8, line 27, "input" should be --output--.

Signed and Sealed this

Twenty-ninth Day of January, 1991

Attest:

HARRY F. MANBECK, JR.

*Attesting Officer*     *Commissioner of Patents and Trademarks*